(12) United States Patent
Blair

(10) Patent No.: US 7,188,694 B1
(45) Date of Patent: Mar. 13, 2007

(54) ALL-SURFACE VEHICLE

(76) Inventor: Rodney L. Blair, 11009 Dapple Way, Bakersfield, CA (US) 93312

( * ) Notice: Subject to any disclaimer, the term of this patent is extended or adjusted under 35 U.S.C. 154(b) by 251 days.

(21) Appl. No.: 10/628,123

(22) Filed: Jul. 28, 2003

(51) Int. Cl.
*B62D 61/00* (2006.01)

(52) U.S. Cl. ............................... 180/218; 280/210

(58) Field of Classification Search ............... 180/218, 180/6.5, 6.48, 6.28, 21; 280/205, 210, 211, 280/206, 207, 208; 482/78
See application file for complete search history.

(56) References Cited

U.S. PATENT DOCUMENTS

| | | | | |
|---|---|---|---|---|
| 286,593 A | * | 10/1883 | Deputy | 280/208 |
| 2,909,145 A | * | 10/1959 | De Hertelendy | 180/218 |
| 3,183,020 A | * | 5/1965 | Hawver | 280/208 |
| 3,313,365 A | * | 4/1967 | Jackson | 180/6.2 |
| 4,298,197 A | * | 11/1981 | Flagg | 482/78 |
| 5,417,598 A | * | 5/1995 | Stauffer | 440/100 |
| 5,871,386 A | * | 2/1999 | Bart et al. | 446/460 |
| 6,752,231 B2 | * | 6/2004 | Hume | 180/218 |
| 6,857,490 B2 | * | 2/2005 | Quigg | 180/9.28 |
| 2002/0011368 A1 | * | 1/2002 | Berg | 180/218 |

* cited by examiner

*Primary Examiner*—Tony Winner
(74) *Attorney, Agent, or Firm*—Robert M. Sperry, Esq.

(57) ABSTRACT

An all-surface vehicle comprising a pair of large inflatable tubes mounted on a common axis with sufficient buoyancy to enable the vehicle to travel on water and having a motor for independently driving each of the tubes, together with a passenger or load carrying compartment; the motor and compartment being mounted with their center of gravity below the axis of the tubes.

17 Claims, 3 Drawing Sheets

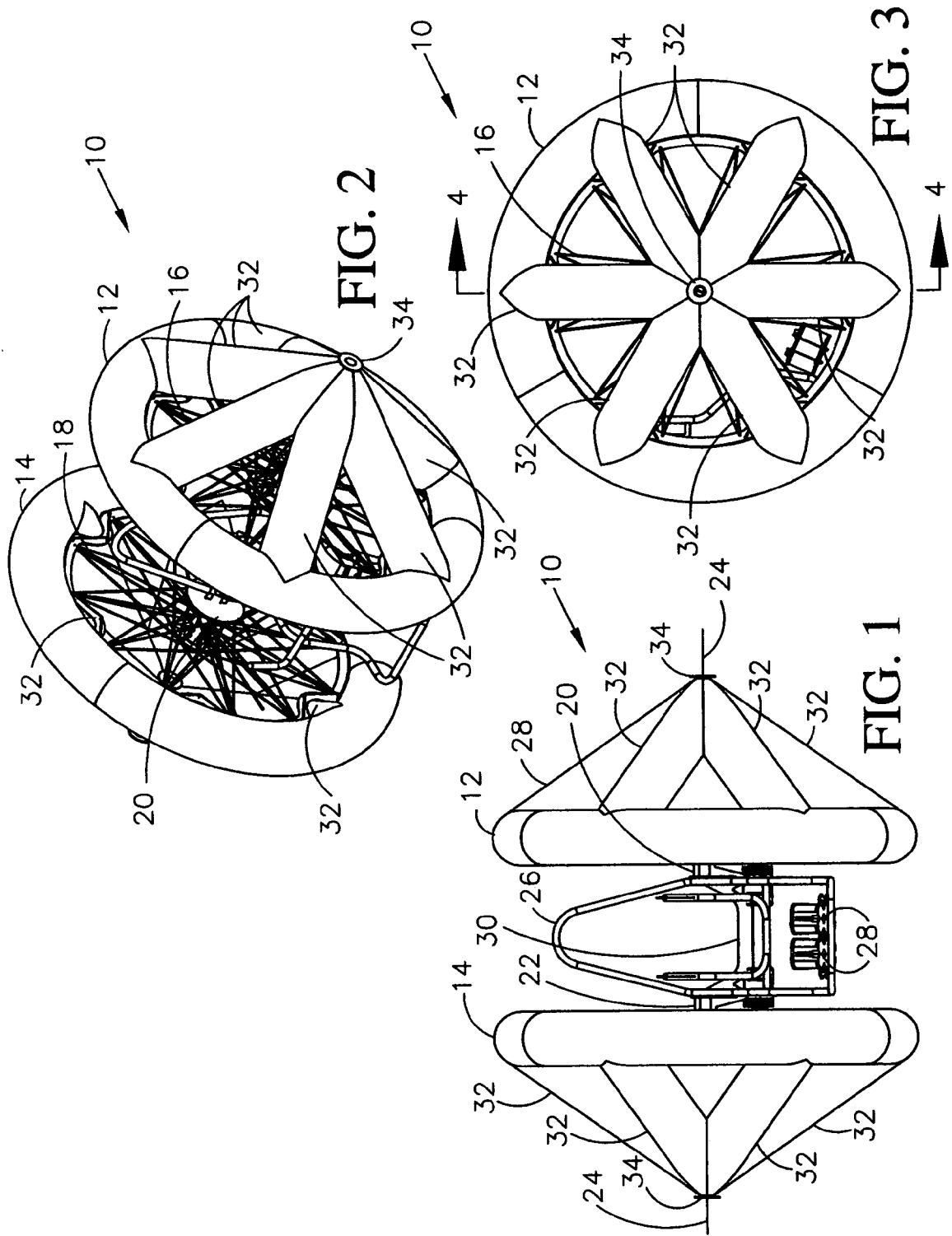

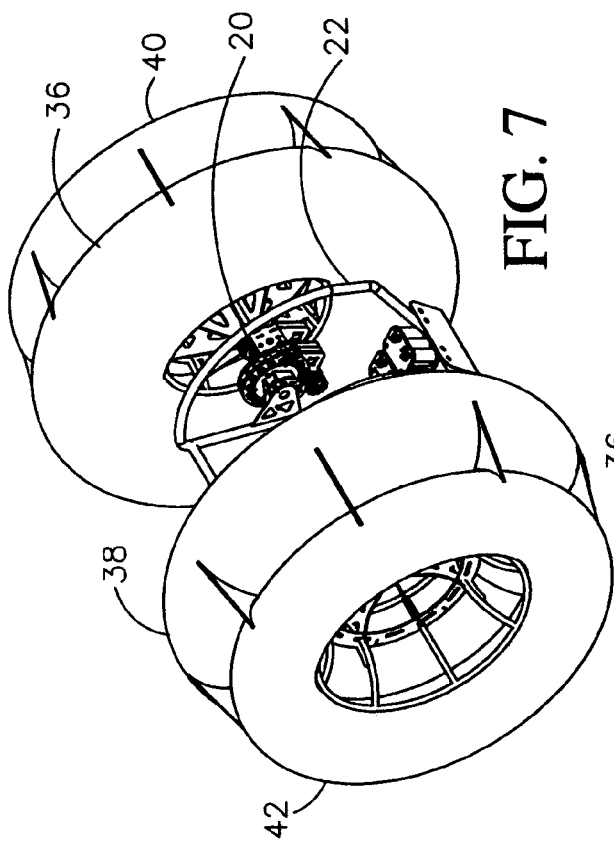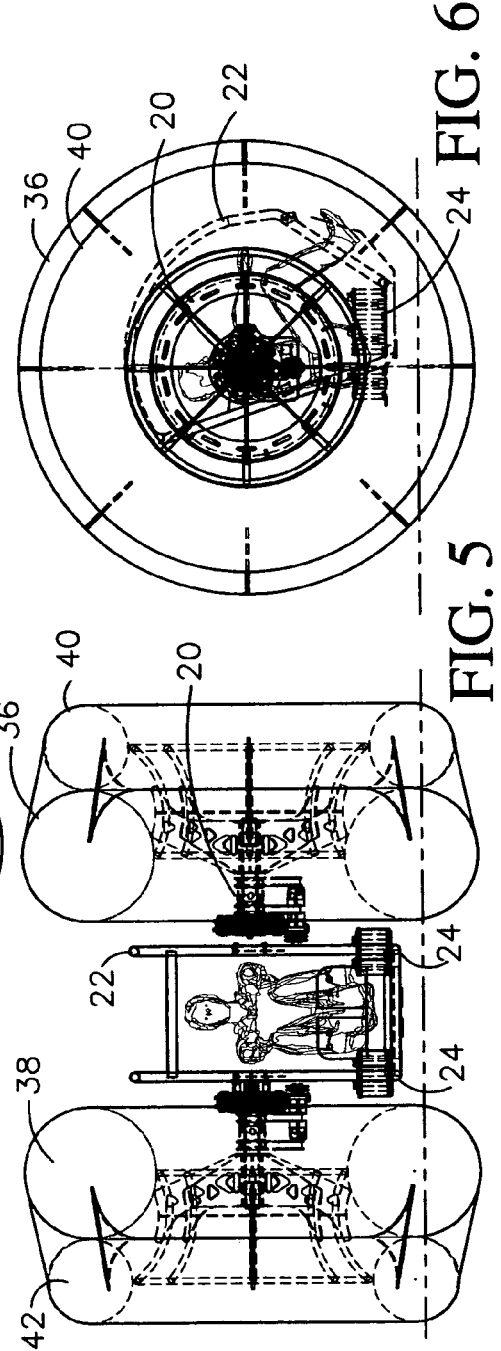

ALL-SURFACE VEHICLE

FIELD OF INVENTION

This invention relates to vehicles and is particularly directed to improved vehicles for traversing earth, water, surf, ice, snow, sand, mud or substantially any other surface.

PRIOR ART

Off-road and All-terrain vehicles have been popular for several years. However, the term "all-terrain" has really been a misnomer, since these vehicles are not amphibious and cannot traverse ice or snow without extreme difficulty. Amphibious vehicles have been known. However, most of these are large, bulky truck-type vehicles having little use except for military purposes. Also, these amphibious vehicles have not been capable of operating on thin ice, snow or loose sand. A truly all surface vehicle was disclosed in my previous U.S. Pat. No. 5,660,858. However, this vehicle was a manually powered device intended primarily for recreational purposes. Thus, none of the prior art vehicles have been entirely satisfactory.

BRIEF SUMMARY AND OBJECTS OF INVENTION

These disadvantages of the present invention are preferably attained by providing an all-surface vehicle capable of operation on substantially any surface, such as earth, water, surf, ice, snow, sand, mud and the like and of moving from one to the other without difficulty. Also, the vehicle of the present invention can be controlled by an on-board driver or by remote control and can be stored in a very small container and inflated on-site for rescue or recreational purposes. Furthermore, the vehicle of the present invention is highly maneuverable and extremely stable and safe.

These advantages of the present invention are preferably attained by providing an improved all-surface vehicle having a pair of large inflatable tubes mounted on a common axis with sufficient buoyancy to enable said vehicle to travel on water and having motor means for independently driving each of said tubes, together with a passenger or load carrying compartment; said motor and compartment being mounted with their center of gravity below the axis of said tubes.

Accordingly, it is an object of the present invention to provide an all-surface vehicle.

Another object of the present invention is to provide an all-surface vehicle which is capable of operation on substantially any surface, such as earth, water, surf, ice, snow, sand, mud and the like and of moving from one to the other without difficulty.

An additional object of the present invention is to provide an all-surface vehicle which can be stored in a very small container and inflated on-site for rescue or recreational purposes.

A further object of the present invention is to provide an all-surface vehicle which is highly maneuverable and extremely stable and safe.

A specific object of the present invention is to provide an all-surface vehicle comprising a pair of large inflatable tubes mounted on a common axis with sufficient buoyancy to enable said vehicle to travel on water and having motor means for independently driving each of said tubes, together with a passenger or load carrying compartment; said motor and compartment being mounted with their center of gravity below the axis of said tubes.

These and other objects and features of the present invention will be apparent from the following detailed description, taken with reference to the figures of the accompanying drawing.

BRIEF DESCRIPTION OF THE DRAWING

FIG. 1 is a front view of an all-surface vehicle embodying the present invention;

FIG. 2 is an isometric view of the all-surface vehicle of FIG. 1;

FIG. 3 is a side view of the all-surface vehicle of FIG. 1;

FIG. 5 is a front view of another alternative form of the all-surface vehicle of FIG. 1;

FIG. 6 is a side view of the all-surface vehicle of FIG. 5; and

FIG. 7 is an isometric view of the all-surface vehicle of FIG. 5;

DETAILED DESCRIPTION OF THE INVENTION

Figure 4:
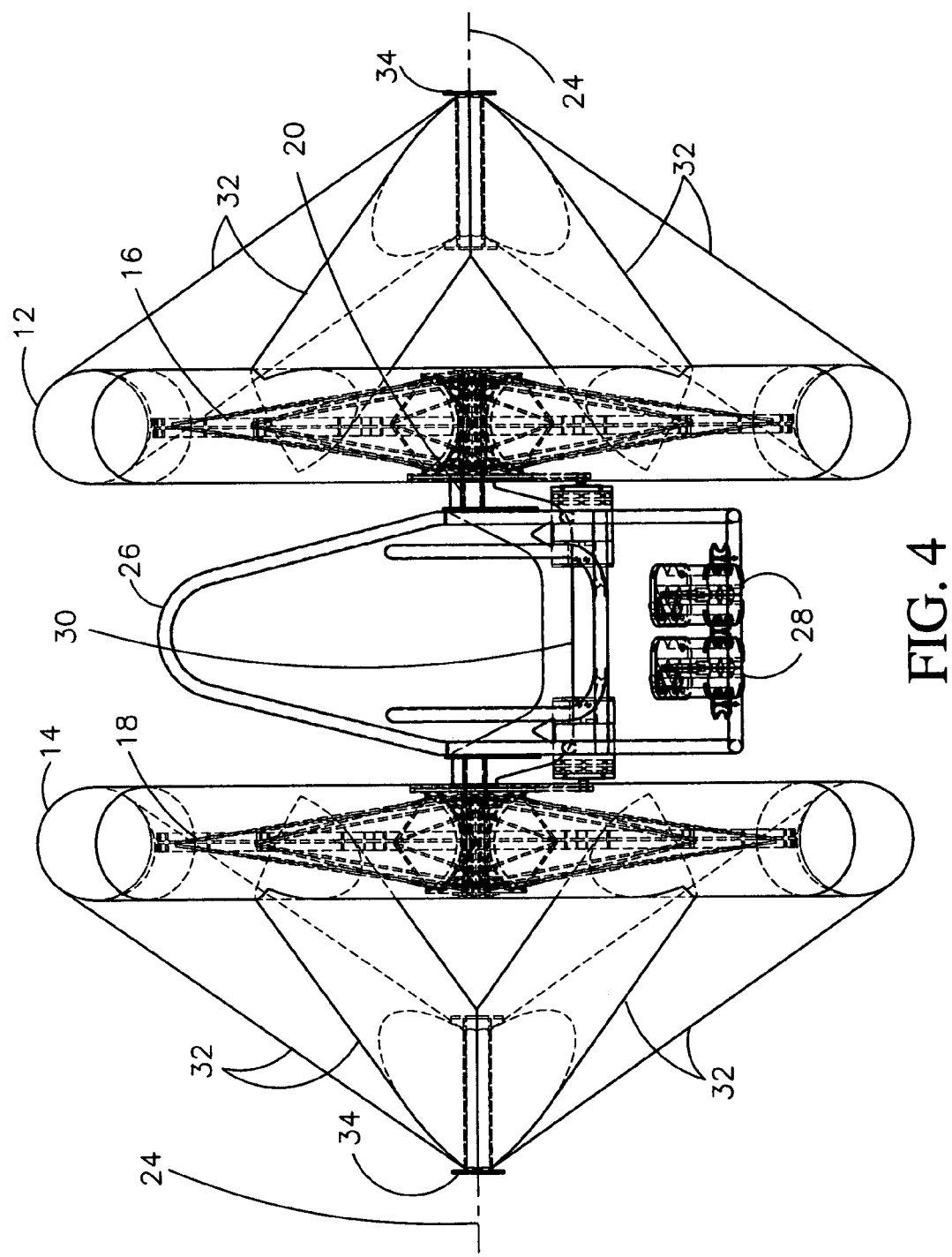
FIG. 4 is a vertical section through the all-surface vehicle of FIG. 1; taken on the line 4—4 of FIG. 3.

In that form of the present invention chosen for purposes of illustration, FIG. 1 shows an all-surface vehicle, indicated generally at 10, comprising a pair of inflated tubes 12 and 14 supported by suitable means, such as frameworks 16 and 18, as best seen on FIGS. 2 and 4, and joined by axles 20 and 22 on a common axis 24. The tubes 12 and 14 are of sufficient size to provide enough buoyancy to support the vehicle 10 on water. The axles 20 and 22 support a carriage 26 carrying one or more motors 28 for independently driving the tubes 12 and 14, together with a compartment 30 for carrying a driver or payload. Also, the motors 28 may include manual control means for use by a driver or radio control means to permit the vehicle 10 to be operated remotely by radio or the like. As seen in FIGS. 2 and 4, the frameworks 16 and 18 are formed of metal or wire spokes. However, if desired, the frameworks 16 and 18 could be formed of inflatable tubes, which would allow the vehicle to be deflated so as to fit in a very small container for convenient storage and easy transportation and to be inflated on-site for use. Alternatively, the frameworks 16 and 18 could be replaced by discs of transparent plastic, such as teflon or the like. Preferably, one or more inflatable ribs 32 will be provided projecting outwardly from each of the tubes 12 and 14 and meet at common points 34. This serves to prevent capsizing or roll-over in white water, surf and the like.

In use, the vehicle 10 is inflated and the motors 28 are started. If a driver is to control the vehicle 10, the driver sits in the compartment 30. The location of the compartment 30 places the center of gravity of the motors 28 and compartment 30 below the axis 24 of the tubes 12 and 14 which makes the vehicle 10 very stable. As noted above, the tubes 12 and 14 are independently powered. Consequently, by driving one tube, tube 10 for example, forward and driving tube 14 backward, the vehicle 10 can be turned within its own length. Thus, the vehicle 10 is highly maneuverable and extremely stable. Also, because of the size of the wheels 12 and 14, the vehicle 10 has a very large footprint and, hence, can travel easily over sand, snow, ice, mud or rocky terrain and, because of the buoyancy provided by the wheels 12 and 14, the vehicle 10 can drive directly from land to water and vice versa without requiring a dock or prepared ramp. If desired, the compartment 30 may be extended rearward, as long as it remains within the dimensions of the tubes 12 and 14. This permits the vehicle 10 to carry one or more passengers or load, which enables the vehicle 10 to be used for rescue purposes or the like. Because the vehicle 10 can be deflated for storage, the vehicle 10 can conveniently be carried in a helicopter or airplane and can be automatically inflated when it is dropped to a person in need of rescue. Also, since the vehicle 10 can be operated by remote control, it can be mounted with cameras or other sensing devices and used robotically for locating survivors of earthquakes or other disasters or for searching for bombs or the like. Furthermore, the large footprint of the vehicle 10 allows it to travel over land mines which have been set to respond to the pressure of larger vehicles, such as tanks, trucks and the like.

FIGS. 5–7 show an alternative form of the vehicle 10 having two sets of dual tubes 36 and 38 and 40 and 42, with the outer tubes 40 and 42 being slightly smaller in diameter then the inner tubes 36 and 38. This form of the present invention provides substantially the same stability as that of FIG. 1, but provides better lateral visibility for the driver, since it avoids the ribs 32. In use, this form of the present invention functions is essentially the same manner as that of FIG. 1.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. An all-surface vehicle comprising:
a pair of inflatable tubes mounted on a common axis, each of said tubes are dual tubes having inner and outer tubes with the outer tube of each set being of slightly less diameter than the inner tube,
a motor carried by said tubes and including means for independently driving each of said tubes, and
a load carrying compartment mounted so that its center of gravity is below said axis.
2. The device of claim 1 wherein:
said tubes have sufficient buoyancy to enable said vehicle to travel on water.
3. The device of claim 1 wherein:
said tubes are supported on a framework of spokes.
4. The device of claim 3 wherein:
said spokes are formed of metal.
5. The device of claim 3 wherein:
said spokes are formed of wire.
6. The device of claim 3 wherein:
said spokes are formed of inflatable tubes.
7. The device of claim 1 wherein:
said tubes are supported by discs of transparent plastic.
8. The device of claim 1 wherein:
said means for driving said tubes includes means for remotely controlling the operation of said vehicle.
9. The device of claim 1 wherein:
said compartment includes seating for at least one human.
10. The device of claim 1 wherein:
said means for driving said tubes includes manual means for operation by a human driver.
11. An inflatable vehicle comprising:
a pair of circular tubes mounted in parallel, spaced relation and joined by a supporting structure, each of said tubes are dual tubes having inner and outer tubes with the outer tube of each set being of slightly less diameter than the inner tube,
said supporting structure serving to carry a load having its center of gravity supported below the axis of said tubes.
12. The device of claim 11 wherein:
said supporting structure includes seating for at least one human.
13. The device of claim 12 wherein:
said motor serves to drive said tubes independently.
14. The device of claim 12 wherein:
said motor includes manual controls.
15. The device of claim 12 wherein:
said motor includes means for remotely controlling said vehicle.
16. The device of claim 11 wherein:
said supporting structure carries at least one motor for driving said tubes.
17. The device of claim 11 wherein:
said tubes have sufficient buoyancy to enable said vehicle to travel on water.

* * * * *